United States Patent
Nakamura et al.

(10) Patent No.: US 8,055,621 B2
(45) Date of Patent: *Nov. 8, 2011

(54) MAP UPDATING SYSTEMS, METHODS, AND PROGRAMS

(75) Inventors: Norihiro Nakamura, Toyokawa (JP); Kimiyoshi Sawai, Okazaki (JP); Hironobu Sugimoto, Toyota (JP); Tomoki Kodan, Nagoya (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 197 days.

This patent is subject to a terminal disclaimer.

(21) Appl. No.: 12/227,796

(22) PCT Filed: Jun. 7, 2007

(86) PCT No.: PCT/JP2007/061958
§ 371 (c)(1),
(2), (4) Date: Feb. 6, 2009

(87) PCT Pub. No.: WO2007/142362
PCT Pub. Date: Dec. 13, 2007

(65) Prior Publication Data
US 2009/0150457 A1    Jun. 11, 2009

(30) Foreign Application Priority Data
Jun. 9, 2006 (JP) ................... 2006-160889

(51) Int. Cl.
*G06F 12/00* (2006.01)
(52) U.S. Cl. ............... 707/638; 707/920; 707/E17.018; 701/26; 701/207; 455/899
(58) Field of Classification Search ........... 707/999.203, 707/E17.018, 638, 920; 701/26, 207; 455/899
See application file for complete search history.

(56) References Cited

U.S. PATENT DOCUMENTS
6,230,098 B1    5/2001    Ando et al.
(Continued)

FOREIGN PATENT DOCUMENTS
EP    1 431 712 A2    6/2004
(Continued)

OTHER PUBLICATIONS

Chinese Patent Office, Notice of Submission of Opinion mailed Oct. 27, 2010 in Chinese Patent Application No. 10-2008-7028848 w/English-language Translation.
Chinese Patent Office, Partial Translation of First Notification of Reason(s) for Refusal mailed Jan. 26, 2011 in Chinese Patent Application No. 200780019435.9 w/English-language Translation.
Mar. 17, 2011 Office Action issued in U.S. Appl. No. 12/227,790.

*Primary Examiner* — Tim T. Vo
*Assistant Examiner* — Shiow-Jy Fan
(74) *Attorney, Agent, or Firm* — Oliff & Berridge, PLC

(57) ABSTRACT

Map updating systems, methods, and programs that store map information, including one or more pieces of difference update information, obtain the one or more pieces of difference update information used for updating a part of the map information to a new piece of map information, update the map information based on the one or more pieces of difference update information, and obtain total update information used for updating an entirety of the map information to a new piece of map information. The systems, methods, and programs perform a total update on the map information based on the total update information, update the map information on which the total update has been performed based on the one or more pieces of difference update information, and delete the one or more pieces of difference update information from the memory after the map information is updated by the reupdating means.

15 Claims, 9 Drawing Sheets

U.S. PATENT DOCUMENTS

| | | |
|---|---|---|
| 6,546,334 B1 | 4/2003 | Fukuchi et al. |
| 2004/0125989 A1 | 7/2004 | Kimura |
| 2004/0133343 A1 | 7/2004 | Hashida et al. |
| 2004/0135705 A1* | 7/2004 | Umezu et al. ............ 340/995.14 |
| 2004/0193370 A1* | 9/2004 | Umezu et al. ................ 701/210 |
| 2004/0220957 A1* | 11/2004 | McDonough ................ 707/102 |
| 2006/0095202 A1* | 5/2006 | Atarashi et al. ............... 701/208 |
| 2007/0156759 A1* | 7/2007 | Sekine et al. ............. 707/104.1 |
| 2007/0220065 A1* | 9/2007 | Coyle et al. .................... 707/203 |

FOREIGN PATENT DOCUMENTS

| | | |
|---|---|---|
| JP | A-2001-012957 | 1/2001 |
| JP | A-2004-198841 | 7/2004 |
| JP | A-2004-287705 | 10/2004 |

* cited by examiner

FIG. 3

[NATIONWIDE]
- INTER-URBAN EXPWYS.
- URBAN EXPWYS.
- TOLL ROADS
- NATL. ROUTES IDENTIFIED WITH ONE-DIGIT AND TWO-DIGIT NUMBERS

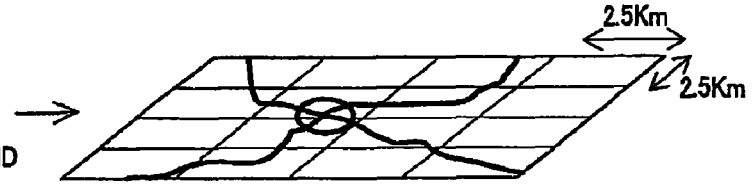

[GENERAL]
- NATL. ROUTES IDENTIFIED WITH THREE OR MORE DIGIT NUMBERS
- MAJOR LOCAL ROADS
- PREFECTURAL ROADS
- GENERAL ROADS

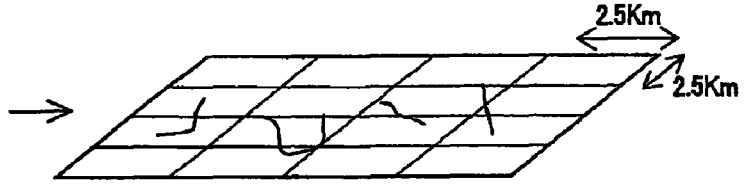

[SMALL STREETS]
- SMALL STREETS

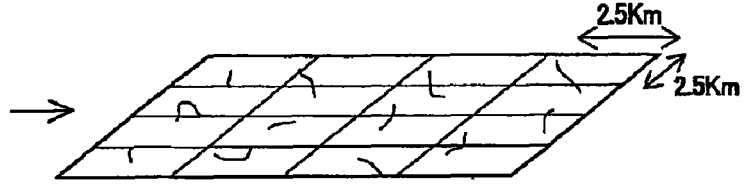

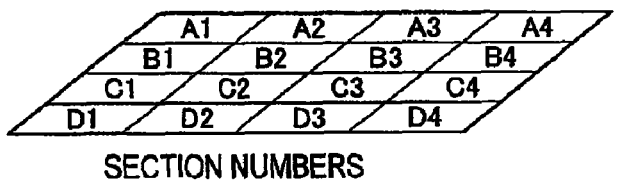

SECTION NUMBERS

| DISTRIBUTION ROAD CLASSIFICATION TYPES | SECTION ID | VERSION |
|---|---|---|
| NATIONWIDE | A1 | 1 |
| NATIONWIDE | A2 | 2 |
| NATIONWIDE | A3 | 0 |
| NATIONWIDE | A4 | 1 |
| ⋮ | ⋮ | ⋮ |
| GENERAL | A1 | 0 |
| GENERAL | A2 | 1 |
| ⋮ | ⋮ | ⋮ |
| SMALL STREETS | A1 | 1 |
| SMALL STREETS | A2 | 2 |
| ⋮ | ⋮ | ⋮ |

FIG. 6
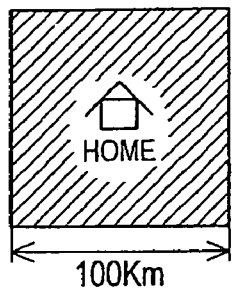
EXAMPLE:
MAP OF 100 KM SQUARED AREA CENTERED AROUND HOME IS UPDATED AS ACTIVITY AREA
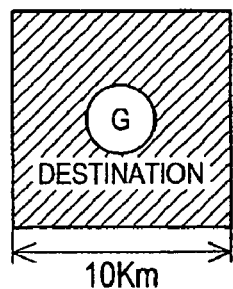
EXAMPLE:
MAP OF 10 KM SQUARED AREA CENTERED AROUND DESTINATION IS UPDATED AS ACTIVITY AREA

FIG. 8
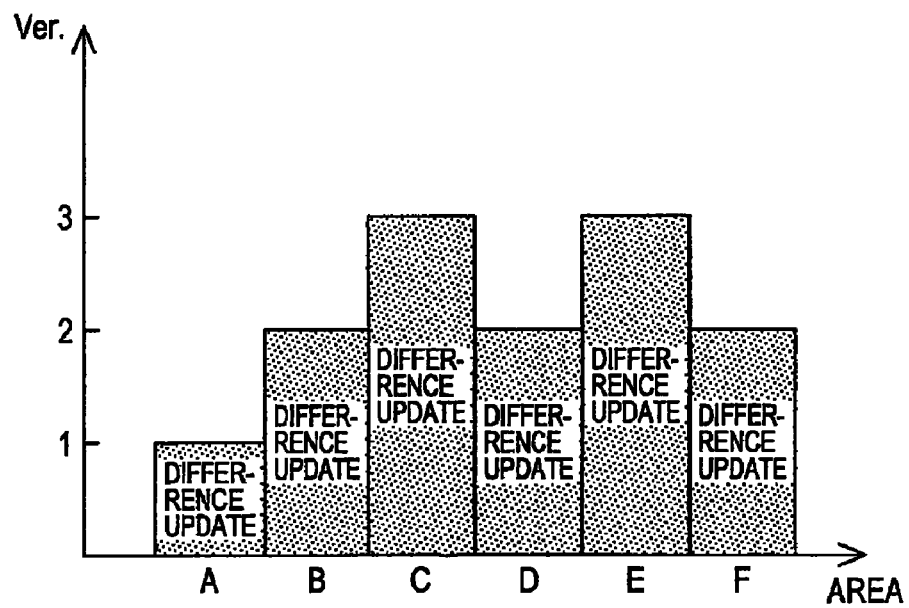
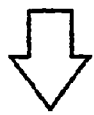
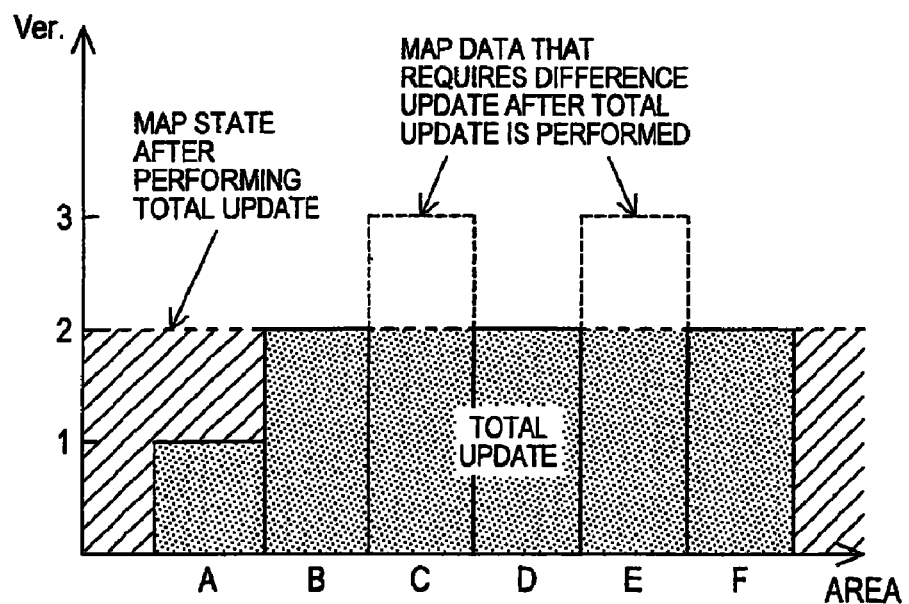

MAP UPDATING SYSTEMS, METHODS, AND PROGRAMS

INCORPORATION BY REFERENCE

This application is a National Phase of International Patent Application No. PCT/JP2007/061958, filed Jun. 7, 2007, which claims priority of Japanese Patent Application No. 2006-160889, filed Jun. 9, 2006. The disclosures of these application are incorporated herein by reference in their entirety.

BACKGROUND

1. Related Technical Fields

Related technical fields include map updating systems that update a part of, or the entirety of, map information stored in a navigation apparatus or the like to new map information, based on difference update information or total update information.

2. Related Art

Recently, many vehicles have a navigation apparatus installed therein, the navigation apparatus being operable to provide driving guidance for the vehicle and to help the driver to easily reach a desired destination. In this situation, the navigation apparatus denotes an apparatus that is operable to detect a current position of the vehicle with the use of a GPS receiver or the like, obtain map data that corresponds to the current position from a recording medium such as a DVD-ROM or an HDD or via a network, and display the obtained map data on a liquid crystal display monitor. The map data that contains the current position of the vehicle is read from the recording medium or the like, and a map image of the current position of the vehicle is rendered based on the map data and displayed on the display apparatus. Also, a vehicle position mark (i.e., the vehicle location) is superimposed on the map image. The map image is scrolled according to the movement of the vehicle, or the vehicle position mark is moved while the map image is fixed on the screen, so that, the navigation apparatus allows the driver to understand, at a glance, where the vehicle is traveling at any given moment.

New roads (newly constructed roads) are constructed every year nationwide. Also, due to the construction of the new roads, some roads no longer exist, and the formation of existing roads is changed. Thus, it is necessary to update the map data stored in the navigation apparatus at certain intervals of time. In this situation, the map data is updated by buying a new DVD and replacing an old DVD with the new one, or rewriting the contents of the HDD based on map data distributed from a map information distribution center or the like. For rewriting the contents of the HDD, there are basically two types of updating methods as described below:

One method is, when there has been a change in the roads or the like, the map information distribution center creates difference update data used for updating only the changed part. When there is some difference update data related to a specific area (e.g. an area in the neighborhood of one's home that is registered) that needs to be updated in each navigation apparatus, the map data is updated to new map data with the use of the difference update data (Japanese Patent Publication No. 2004-198841).

The second method is the map information distribution center creates total update data used for collectively updating, at regular intervals (for example, once every year), the nationwide map data to new map data that reflects the present road state, so that the map data is completely updated to the new map data by using the created total update data.

SUMMARY

Conventionally, in principle, the update based on the difference update data and the update based on the total update data are performed in parallel with each other. In other words, as for each specific area that is considered to require an update, the map data is constantly updated to new map data by using the difference update data, and together with that, at a predetermined period, the nationwide map data is collectively updated.

However, for the total update data used for collectively updating the nationwide map data (hereinafter, referred to as "total update"), there is a big difference between a time at which the data is created and a time at which the data is sold. Thus, depending on the timing when the total update is performed, there is a possibility that the map data may be changed back to the map data that was in use before an update is performed based on difference update data (hereinafter, referred to as "difference update"). FIG. 9 is a drawing that shows an example of a schedule for performing total updates and difference updates.

As shown in FIG. 9, total updates are performed at predetermined times of the year, which are, for example, at the end of December and at the end of June, to create the total update data which is in correspondence with the changes of the roads and the like, up to those points in time. The created total update data is released for sale on, for example, April 1st and on October 10th, so that it is possible to perform a total update on the map data at retail stores (i.e., dealers). Take, for instance, an example in which a user performs a total update on the map data at a retail store at the end of September. The total update data released for sale on April 1st is used in the update process, so the map data owned by the user is updated to the map data created at the end of December, which is nine months before the total update is performed. In this example, as shown in FIG. 9, assuming that four difference updates have been performed based on difference update data on November 25th, February 18th, May 1st, and September 1st, the total update data that was created at the end of December is in correspondence with the difference update performed on November 25th, but is not in correspondence with the other difference updates. Thus, it is necessary to perform again the three difference updates that were performed on February 18th, May 1st, and September 1st. Consequently, it is necessary to obtain pieces of difference update data again from the map information distribution center. As a result, this situation leads to an increase in the processing load related to the communication time periods and the communication process.

Various exemplary implementations of the broad principles described herein provide a map updating system with which there is no need to obtain difference update information again, including a case where it is necessary to perform an update again with difference update information when a total update has been performed on the map information. Thus, it is also possible to shorten the time period it takes to perform the update and to reduce the processing load.

Various exemplary implementations provide systems, methods, and programs that store map information, including one or more pieces of difference update information, obtain the one or more pieces of difference update information used for updating a part of the map information stored in the memory to a new piece of map information, and update the map information based on the one or more pieces of difference update information. The systems, methods and programs obtain total update information used for updating an entirety of the map information stored in the memory to a new piece of map information, and perform a total update on the map information based on the total update information. The systems, programs and methods compare, after the total update, a version of the total update information used in the total update with each of versions of the one or more pieces of difference update information stored in the memory, extract, from the memory, any of the one or more pieces of difference update information of which the version is judged to be newer, update the map information on which the total update has been performed based on said any of the difference update information, and delete the one or more pieces of difference update information including said any of the difference update information from the memory after the map information is updated.

BRIEF DESCRIPTION OF THE DRAWINGS

Exemplary implementations will now be described with reference to the accompanying drawings, wherein:

FIG. 3 is an explanatory drawing for explaining an exemplary mechanism that manages versions of the map data in the map updating system;

FIG. 6 shows drawings each of which shows an exemplary update target area that is used when a difference update is performed;

FIG. 8 presents schematic charts that show, for each of the areas, versions of navigation map data before a total update is performed and versions of navigation map data after the total update is performed.

DETAILED DESCRIPTION OF EXEMPLARY IMPLEMENTATIONS

Figure 1:
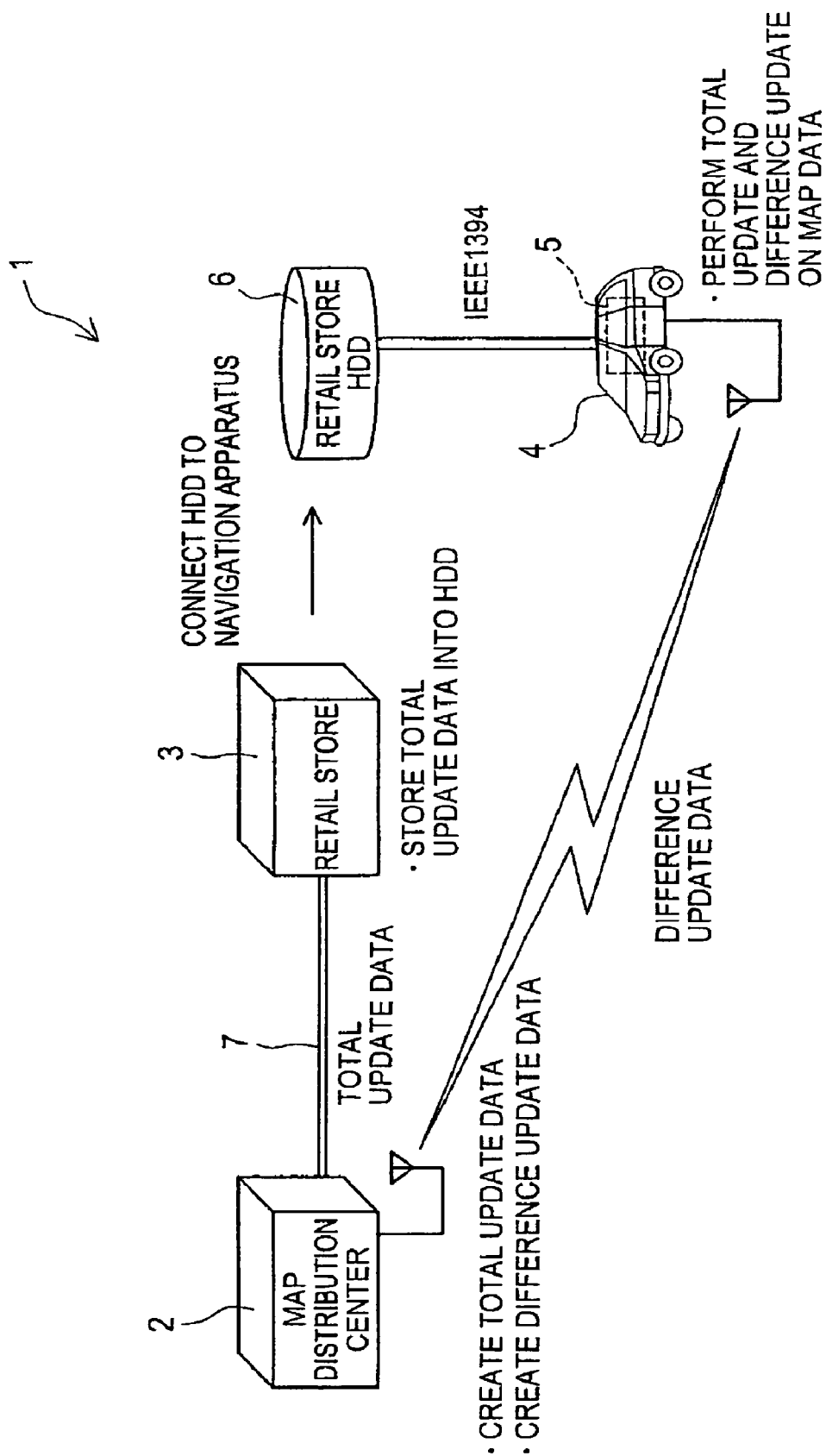
FIG. 1 is an exemplary schematic configuration drawing of a map updating system.
Figure 2:
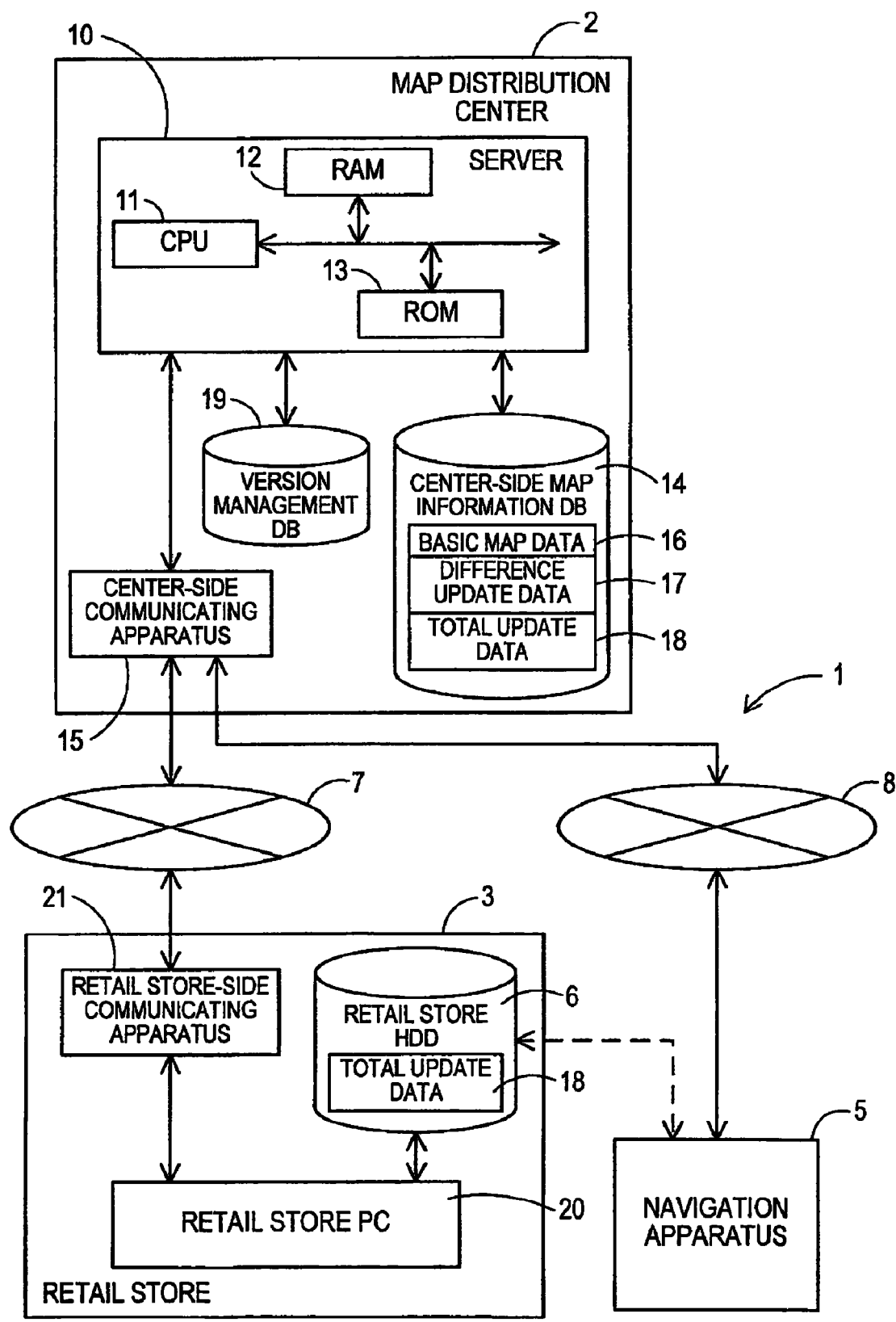
FIG. 2 is a block diagram that shows exemplary configurations of the map updating system.

An exemplary map updating will be explained in detail below. FIG. 1 is an exemplary schematic configuration drawing of the map updating system 1. FIG. 2 is an exemplary block diagram that shows configurations of the map updating system 1.

As shown in FIG. 1, the map updating system 1 basically includes: a map distribution center 2, a retail store 3, and a navigation apparatus 5 (see FIG. 4) installed in a vehicle 4.

The map distribution center 2 is a distribution center that creates update data used for updating an old version of map data to a new version of map data and distributes the created data. The retail store 3 is a supply facility that saves the pieces of update data distributed from the map distribution center 2 and supplies the pieces of update data to users who visit the retail store. The navigation apparatus 5 is installed in each vehicle 4 that is driving or being parked on a road somewhere in the country. The navigation apparatus 5 is an in-vehicle device that displays a map of the area surrounding the vehicle 4 based on the map data stored therein and also searches for a route and provides guidance to a specified destination.

The map distribution center 2 and the retail store 3 are configured so as to be able to communicate with each other bi-directionally, via a network 7 for satellite communication or the like. The map distribution center 2 and the retail store 3 transmit and receive various types of information such as total update data therebetween. The total update data is update data used for collectively updating the total area of the map data that has been created by the map distribution center 2 and stored in the navigation apparatus 5 (hereinafter, referred to as "total update").

In the retail store 3, a retail store HDD (Hard Disk Drive) 6, which is a storage medium connected to a retail store PC (Personal Computer) 20, is configured so as to be removable. The retail store HDD 6 has been removed and is newly connected to the navigation apparatus 5 by using the IEEE 1394 (Institute of Electrical and Electronic Engineers 1394) standard or the like, so that the retail store 3 and the navigation apparatus 5 are able to transmit and receive various types of information such as the total update data to and from each other.

On the other hand, the map distribution center 2 and the navigation apparatus 5 are configured so as to be able to communicate with each other bi-directionally by using a communication device such as a mobile phone, a wireless LAN card, or the like. The map distribution center 2 and the navigation apparatus 5 transmit and receive various types of information such as difference update therebetween. The difference update data is update data used for updating only a specific area of the map data that has been created by the map distribution center 2 and stored in the navigation apparatus 5 (hereinafter, referred to as "difference update").

The map distribution center 2 and the navigation apparatus 5 may also communicate via a recording medium such as a CD-R. In that case, necessary information is once downloaded to a user's PC connected to the map distribution center 2 via an Internet connection. After that, the downloaded information is recorded onto the CD-R, so that the navigation apparatus 5 can read the downloaded information and is able to obtain the difference update data.

The navigation apparatus 5 is configured so as to be able to perform the total update and the difference update on the stored map data, by using the total update data and the difference update data obtained from the map distribution center 2 or the retail store 3. Further, the navigation apparatus 5 is able to search for a route and provide guidance based on the stored map data. An exemplary configuration of the navigation apparatus 5 will be explained in detail later, with reference to FIG. 4.

Next, an exemplary map distribution center 2 included in the map updating system 1 will be explained further in detail, with reference to FIG. 2.

The map distribution center 2 includes, as exemplified in FIG. 2, a server 10; a center-side map information. DB 14 that is connected to the server 10 and serves as an information recording unit; a version management DB 19; and a center-side communicating apparatus 15. The server 10 includes a controller (CPU 11) that exercises overall control of the server 10 and serves as a computation device and a controlling device; an internal storage devices such as RAM 12 that is used as a working memory when the CPU 11 performs various types of computation processes; and a ROM 13 that has recorded therein various types of control programs used for performing an update data creation process to create the total update data and the difference update data based on an old version of map data and a new version of map data and a map data distribution process to distribute the created total update data and the created difference update data to the retail store 3 and the navigation apparatus 5. It is also acceptable to use an MPU or the like, instead of the CPU 11.

The center-side map information DB 14 has stored therein basic map data 16 that has been created based on input data and input operations from the outside and is used as a base when the map data stored in the navigation apparatus 5 is updated, while the basic map data 16 is divided into sections according to the versions thereof. In this situation, each of the versions have creation time information used for identifying a time at which the map data was created. By referring to the versions, it is possible to identify a time at which each piece of map data was created. Also, the center-side map information DB 14 has stored therein difference update data 17 that has been created by the server 10 based on the basic map data 16 and is used for performing a difference update to update a part of the map data stored in the navigation apparatus 5 to a new version of map data as well as total update data 18 that has also been created by the server 10 based on the basic map data 16 and is used for performing a total update to update the entirety of the map data stored in the navigation apparatus 5 to a new version of map data, while the difference update data 17 and the total update data 18 are divided into sections according to the versions thereof.

The basic map data 16, the difference update data 17, and the total update data 18 will be explained more in detail later.

The version management DB 19 has recorded therein information related to the versions of the map data stored in each navigation apparatus 5. In the map data, various types of information that are required in providing route guidance and displaying maps are recorded. For example, the map data includes map display data used for displaying maps, intersection data related to intersections, node data related to node points, link data related to roads (links), search data used for searching for a route, facility data related to facilities, and retrieval data used for retrieving a location point.

In the map updating system 1 according to the present embodiment, the versions of the map data are managed for each of 2.5 square kilometer areas. In order to manage the versions, these 2.5 square kilometer areas are further classified into three types according to a road standard. FIG. 3 is a drawing for explaining an exemplary mechanism for managing the versions of the map data used by the map updating system 1.

As shown in FIG. 3, in order to manage the versions, a section ID is assigned to each of the 2.5 square kilometer areas (A1 to D4 are assigned to sixteen areas in the example shown in FIG. 3). Further, each of the areas is managed by bringing versions into correspondence with the three distribution road classification types defined according to the road standard. More specifically, inter-urban expressways, urban expressways, toll roads, and national routes identified with one-digit and two-digit numbers are classified as a distribution road classification type called "nationwide." National routes identified with a three-digit number, major local roads, prefectural roads, and general roads are classified as a distribution road classification type called "general." Small streets are classified as a distribution road classification type called "small streets." Accordingly, for any single area, there are three versions of map data that respectively correspond to different target road types.

For example, for the area A1 shown in FIG. 3, the map data for the distribution road classification type "nationwide" has a version number "1," and the map data for the distribution road classification type "general" has a version number "0," whereas the map data for the distribution road classification type "small streets" has a version number "1."

The center-side communicating apparatus 15 is a communicating apparatus used for communicating with the retail store 3 or the navigation apparatus 5 via a network 7 or 8. In this example, each of the networks 7 and 8 may use a communication system of communication networks such as a LAN (Local Area Network), a WAN (Wide Area Network), an intranet, a mobile phone line network, a telephone line network, a public communication network, a private communication network, or the Internet. Alternatively, it is acceptable to use another communication system that utilizes CS broadcast or BS broadcast realized with a broadcast satellite, a digital terrestrial television broadcast, or FM multiple broadcasting. Further alternatively, it is acceptable to use yet another communication system such as a non-stop automatic toll collection system (ETC) or a dedicated short range communication system (DSRC), both of which are used in the intelligent transport systems (ITS).

On the other hand, as shown in FIG. 2, the retail store 3 includes the retail store PC 20, the retail store HDD 6 that is connected to the retail store PC 20 and serves as an information recording unit, and a retail store-side communicating apparatus 21. The retail store PC 20 is a controlling unit that manages and performs communication with the map distribution center 2 about license information and billing information that are necessary for obtaining the total update data.

The retail store HDD 6 has stored therein the total update data 18 that has been distributed from the map distribution center 2. Further, the retail store HDD 6 is configured so as to be removable from the retail store PC 20. When the removed retail store HDD 6 is connected to the navigation apparatus 5, it is possible to forward the total update data 18 stored in the retail store HDD 6 to the navigation apparatus 5. Thereby, the navigation apparatus 5 is able to perform a total update on the map data, based on the total update data 18 stored in the retail store HDD 6, as explained later.

The retail store-side communicating apparatus 21 is a communicating apparatus that communicates with the map distribution center 2 via the network 7 described above.

Figure 4:
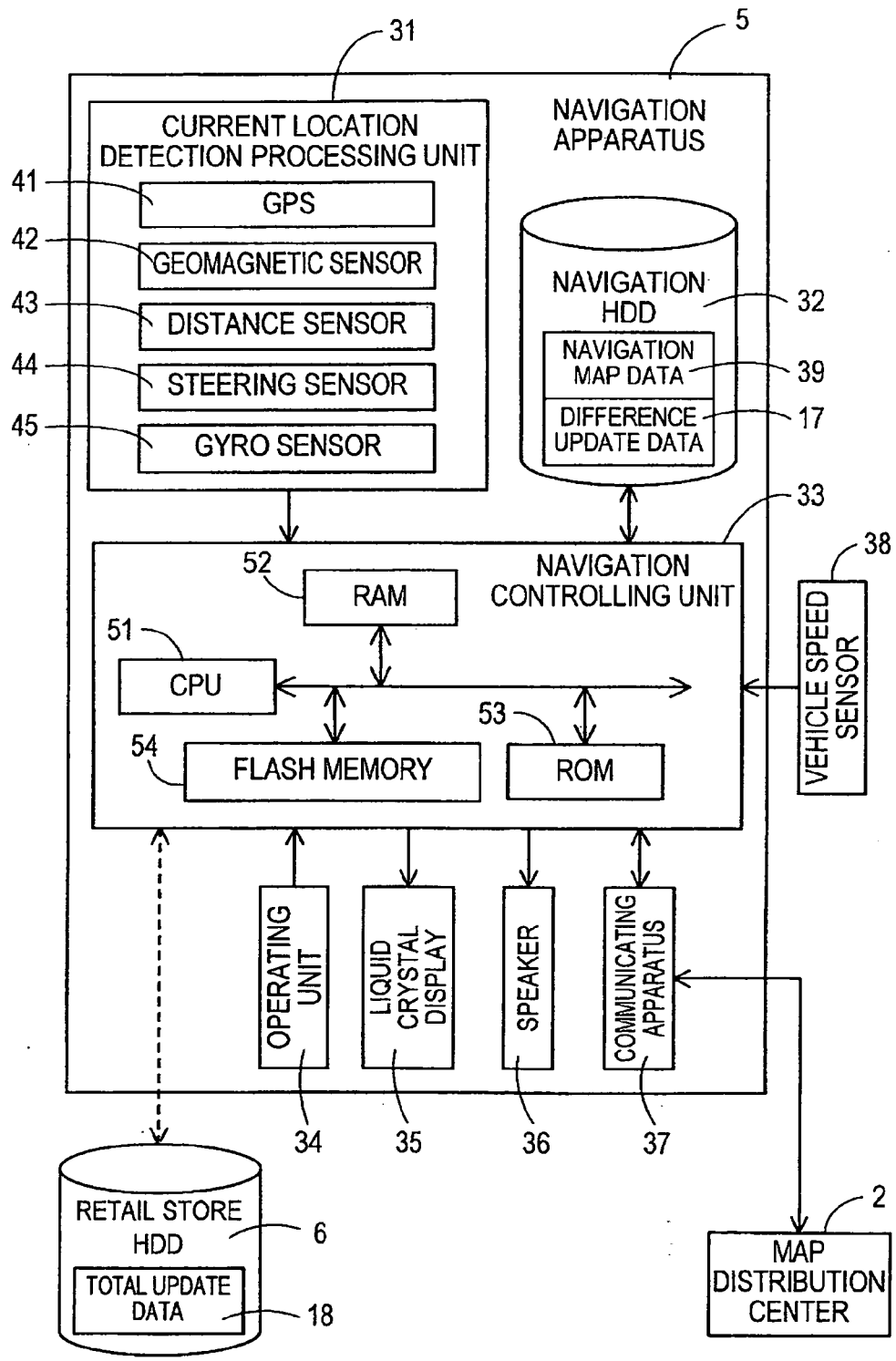
FIG. 4 is a block diagram that shows an exemplary configuration of a navigation apparatus.

Next, a schematic configuration of the navigation apparatus 5 included in the map updating system 1 a will be explained with reference to FIG. 4. FIG. 4 is a block diagram that shows an exemplary configuration of the navigation apparatus 5.

As shown in FIG. 4, the navigation apparatus 5 includes: a current location detection processing unit 31 that detects a current position of the vehicle in which the navigation apparatus 5 is installed; a navigation HDD 32; a navigation controlling unit 33 that performs various types of computation processes based on input information; an operating unit 34 that receives an operation from an operator; a liquid crystal display 35 that displays information such as a map to the operator; a speaker 36 that outputs audio guidance related to route guidance; and a communicating apparatus 37 that communicates with a traffic information center such as a VICS center or the map distribution center 2. A vehicle speed sensor 38 that detects the driving speed of the vehicle is connected to the navigation controlling unit 33. Further, the navigation controlling unit 33 has a connection interface for having the retail store HDD 6 connected thereto.

The constituent elements of the navigation apparatus 5 will be explained below. The current location detection processing unit 31 includes a GPS 41, a geomagnetic sensor 42, a distance sensor 43, a steering sensor 44, a gyro sensor 45 that serves as a direction detecting unit, and an altimeter (not shown in the drawing), so as to be able to detect the location and the direction of the vehicle as well as a distance to a target object (e.g. an intersection) from the vehicle at the current moment.

To be more specific, the GPS 41 detects a current location of the vehicle on the earth and a current time by receiving a radio wave generated by an artificial satellite. The geomagnetic sensor 42 detects an orientation direction of the vehicle by measuring geomagnetism. The distance sensor 43 detects a distance between predetermined positions on a road, or the like. As the distance sensor 43, for example, it is possible to use a sensor that measures a rotation speed of the wheels (not shown in the drawing) of the vehicle and detects a distance based on the measured rotation speed, or a sensor that measures acceleration and detects a distance by integrating the measured acceleration twice.

The steering sensor 44 detects a steering angle of the vehicle. As the steering sensor 44, for example, it is acceptable to use an optical rotation sensor or a rotational resistance sensor attached to a rotating part of a steering wheel (not shown in the drawing), or an angle sensor attached to a wheel.

The gyro sensor 45 detects a gyration angle of the vehicle. As the gyro sensor 45, for example, it is acceptable to use a gas-rate gyro or an oscillation gyro. Also, by integrating the gyration angle detected by the gyro sensor 45, it is possible to detect an orientation direction of the vehicle.

The navigation HDD 32 stores therein navigation map data 39 used by the navigation apparatus 5 for providing driving guidance and searching for a route and the difference update data 17 as well as predetermined programs. In the map updating system 1 according to the present embodiment, the difference update data 17 distributed from the map distribution center 2 to the navigation HDD 32 is kept being recorded for one year at the maximum since the date on which the data was created. In the present embodiment, a hard disk is used as an external storage device and a storage medium for storing the navigation map data 39 and the difference update data 17 therein. However, instead of the hard disk, it is acceptable to use a magnetic disc such as a flexible disk as the external storage device. Alternatively, it is acceptable to use a memory card, a magnetic tape, a magnetic drum, a CD, an MD, a DVD, an optical disk, an MO, an IC card, an optical card, or the like, as the external storage device. Further alternatively, it is acceptable to have the navigation map data 39 and the difference update data 17 stored into mutually different storage media.

Similar to the basic data 16, the navigation map data 39 stores various types of information that are required in providing route guidance and displaying maps, which are, for example, the navigation map data 39 includes map display data used for displaying maps, intersection data related to intersections, node data related to node points, link data related to roads (links), search data used for searching for a route, facility data related to facilities, and retrieval data used for retrieving a location point.

The navigation map data 39 is updated by either performing a total update for collectively updating the map data of total area in the country or performing a difference update for updating the map data of only a specific area. The specific updating processes performed during the total update process and the difference update process will be explained in detail, with reference to flowcharts.

The navigation controlling unit 33 included in the navigation apparatus 5 includes a controller (CPU 51) that exercises overall control of the navigation apparatus 5 and serves as a computation device and a controlling device; internal storage devices such as: a RAM 52 that is used as a working memory when the CPU 51 performs various types of computation processes and stores therein route data obtained when a route has been found in a search or the like, and a ROM 53 that has recorded therein control programs as well as: a route guiding processing program used for searching for a route and providing guidance based on the navigation map data 39 stored in the navigation HDD 32, a map data difference update processing program (FIG. 5) used for performing a difference update on the navigation map data 39 based on the difference update data, and a map data total update processing program (FIG. 7) used for performing a total update on the navigation map data 39 based on the total update data; and a flash memory 54 that records therein a program read from the ROM 53. As the RAM 52, the ROM 53, and the flash memory 54, it is acceptable to use a semiconductor memory, a magnetic core, or the like. It is also acceptable to use an MPU or the like as the computation device and the controlling device, instead of the CPU 51.

Next, an exemplary map data difference update method, for example in the form of a program, will be explained with reference to FIG. 5. The exemplary method may be implemented, for example, by one or more components of the above-described device or by a controller executing a computer-executable program. However, even though the exemplary structure of the above-described device may be referenced in the description, it should be appreciated that the structure is exemplary and the exemplary method need not be limited to any of the above-described exemplary structure.

Figure 5:
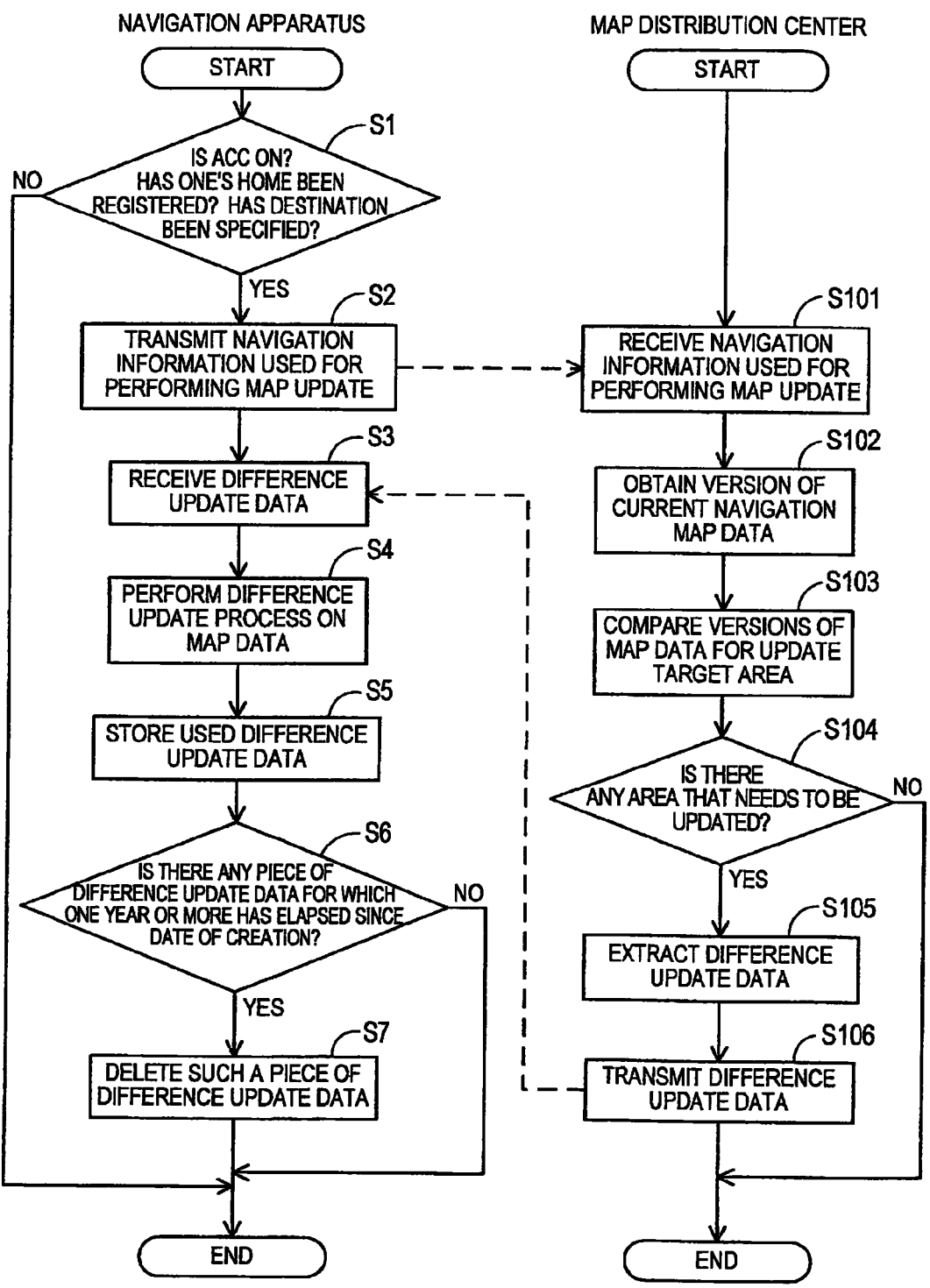
FIG. 5 is a flowchart of an exemplary map data difference update method.

FIG. 5 is a flowchart of the map data difference update method. In this example, the map data difference update processing program is a program used for updating a specific area in the navigation map data 39 stored in the navigation apparatus 5 to a new version of map data, based on difference update data that is newly distributed from the map distribution center 2. The program shown in the flowchart in FIG. 5 is stored in the RAM 52 or the ROM 53 included in the navigation apparatus 5 or in the RAM 12 or the ROM 13 included in the map distribution center 2, and is repeatedly executed by the CPU 51 or the CPU 11 at predetermined intervals.

First, the map data difference update processing program executed by the CPU 51 included in the navigation apparatus 5 will be explained, with reference to FIG. 5. At first, in step (hereinafter, simply expressed as "S") 1, the CPU 51 judges whether or not any of the following conditions under which a difference update process can be started is satisfied: the accessory is turned on; one's home has been registered (or the registration of one's home is changed) by using the operating unit 34; and a destination for which a route search is to be conducted has been specified by using the operating unit 34. When none of these conditions are satisfied (NO in S1), the processing program is ended. When one or more of the conditions are satisfied (YES in S1), the process proceeds to S2.

In S2, the CPU 51 transmits navigation information used for performing a map update to the map distribution center 2. The information transmitted as the navigation information includes an identification ID that identifies the navigation apparatus 5, coordinates of the registered home, and coordinates of the destination if any destination has been specified.

Next, in S3, the CPU 51 receives the difference update data 17 transmitted from the map distribution center 2 via the communicating apparatus 37. The received difference update data 17 contains a version information used for identifying the version of the difference update data 17. Further, in S4, a difference update process is performed on the navigation map data 39 stored in the navigation HDD 32 by using the difference update data 17 received in S3. The process in S3 corresponds to the process performed by the difference update information obtaining means, whereas the process in S4 corresponds to the process performed by the difference updating means.

Next, the difference update process performed in the map updating system 1 according to the present embodiment will be explained. First, in a difference update that is performed when the accessory is turned on, the particular update targets are the map data of the nationwide area (see FIG. 3) classified as the distribution road classification type called "nationwide" and the map data of 100 square kilometer area centered around the home (see FIG. 6) regardless of the distribution road classification type.

In a difference update that is performed when the home is registered (or the registration of the home is changed), the particular update targets are the map data of the nationwide area (see FIG. 3) classified as the distribution road classification type called "nationwide" and the map data of 100 square kilometer area centered around the home (see FIG. 6) regardless of the distribution road classification type.

In a difference update that is performed when a destination is specified, the particular update targets are the map data of the nationwide area (see FIG. 3) classified as the distribution road classification type called "nationwide" and the map data of 10 square kilometer area centered around the destination (see FIG. 6) regardless of the distribution road classification type.

In one of the areas that are the update targets, if there is a road that has newly been constructed or a road that has been changed that corresponds to the distribution road classification type, the map data for the corresponding area is updated to a new version of map data, based on the difference update data transmitted from the map distribution center 2.

Next, in S5, the pieces of difference update data 17 that have been received from the map distribution center 2 in S3 and have been used in the difference update process in S4 are recorded onto the navigation HDD 32. Subsequently, in S6, for each of the pieces of difference update data 17 stored in the navigation HDD 32, it is judged whether there is any piece of difference updated data 17 for which one year or more has elapsed since the data of creation at the distribution center 2. In this situation, each of the pieces of difference update data 17 contains, in advance, data that identifies the date on which the piece of difference update data 17 was created. The current date and time is detected by the GPS 41. The process in S6 corresponds to the process performed by the lapse of period judging means.

If it has been judged that there is any piece of difference update data 17 which is one year old or more (YES in S6), such a piece of the difference update data 17 is deleted from the navigation HDD 32 (S7). On the other hand, if it has been judged there is no piece of difference update data 17 which is older than one year or more (NO in S6), the map data difference update processing program is ended without deleting any data.

In S6 and S7 described above, it is configured so that such a piece of difference update data 17 for which one year or more has elapsed since the date on which the piece was created at the map distribution center 2 is deleted. However, it is acceptable to have another arrangement in which such a piece of difference update data 17 for which one year or more has elapsed since the date on which the piece was obtained by the navigation apparatus 5 is deleted. In such a case, it is necessary to configure the navigation apparatus 5 so as to record, in a separate process, the date on which each of the pieces of difference update data 17 is obtained onto the navigation HDD 32. The process in S7 corresponds to the process performed by the lapse of period information deleting means.

Next, the map data difference update processing program executed by the CPU 11 included in the map distribution center 2 will be explained. First, in S101, the CPU 11 receives navigation information used for performing a map update from the navigation apparatus 5. In this situation, the navigation information is transmitted from the navigation apparatus 5, when the electric power of the navigation apparatus 5 is turned on, when one's home is registered, or when a destination is specified.

Next, in S102, the CPU 11 obtains the information of the version of the navigation map data 39 that is currently stored in the navigation HDD 32 included in the navigation apparatus 5. More specifically, by referring to the version management DB 19, the CPU 11 identifies the navigation apparatus 5 that is an update target, based on the identification ID received as the navigation information in S101 and extracts, from the version management DB 19, the information of the version of the navigation map data 39 in the identified navigation apparatus 5, for each of the areas.

Subsequently, in S103, the CPU 11 compares, for the update target areas of the navigation apparatus 5 that has transmitted the navigation information, the version of the map data that is currently stored in the navigation apparatus 5 with the newest version of the map data stored in the map distribution center 2 and judges if there is any area that needs to be updated (S104). Note that the update target areas are different depending on the condition under which the navigation apparatus 5 starts performing the difference update process on the map data, the registered position of the home, and the position of the specified destination.

When it has been judged that there is an area that needs to be updated (YES in S104), any of the pieces of difference update data 17 that is required in performing an update on the area is extracted out of the center-side map information DB 14 (S105). Then, the extracted piece of the difference update data 17 is transmitted to the navigation apparatus 5 (S106). The transmitted piece of difference update data 17 contains version information used for identifying the version of the piece of difference update data 17. On the other hand, when it has been judged that there is no area that needs to be updated (NO in S104), the process is ended without transmitting any of the difference update data 17 to the navigation apparatus 5.

Figure 7:
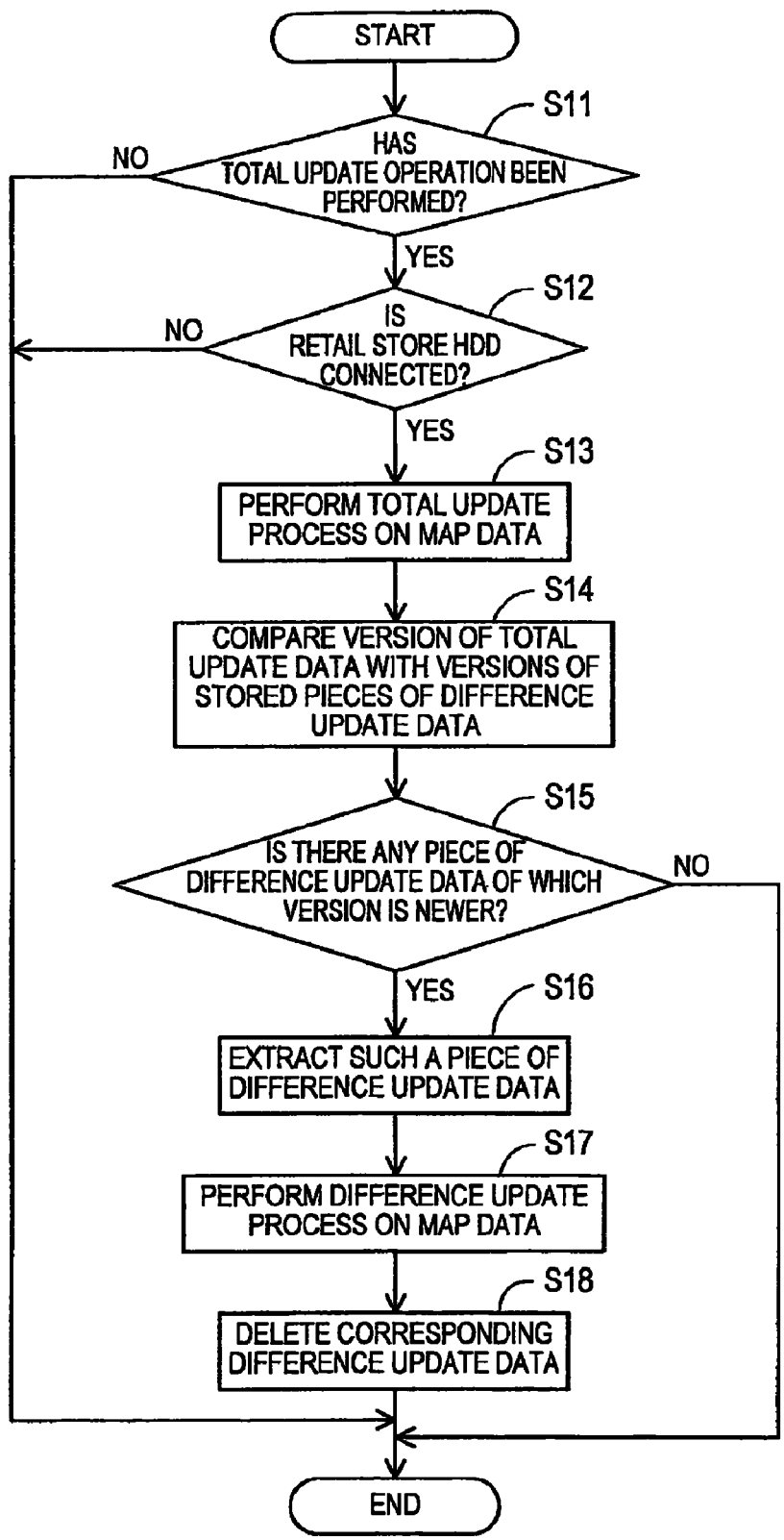
FIG. 7 is a flowchart of an exemplary map data total update method.

Next, an exemplary map data total update method, for example in the form of a processing program, executed by the navigation controlling unit 33 included in the navigation apparatus 5 will be explained with reference to FIG. 7. The exemplary method may be implemented, for example, by one or more components of the above-described device or by a controller executing a computer-executable program. However, even though the exemplary structure of the above-described device may be referenced in the description, it should be appreciated that the structure is exemplary and the exemplary method need not be limited to any of the above-described exemplary structure.

The map data total update processing program is a program used for updating the total area of the navigation map data 39 stored in the navigation apparatus 5 to a specific version of map data, based on the total update data supplied from the retail store HDD 6. The program shown in the flowchart in FIG. 7 is stored in the RAM 52 or the ROM 53 included in the navigation apparatus 5 and is repeatedly executed by the CPU 51 at predetermined intervals after the ignition is turned on.

First, in S11, the CPU 51 judges whether or not an operation to start performing a total update on the map data is performed by using the operating unit 34. When it is judged that the operation to start performing a total update has been performed (YES in S11), the CPU 51 further judges whether or not the retail store HDD 6 is connected to the navigation apparatus 5 (S12).

As a result, when it has been judged that the retail store HDD 6 is connected to the navigation apparatus 5 (YES in S12), the process proceeds to S13 so that the total update on the map data is started. On the other hand, when it has been judged that no operation to start performing a total update has been performed (NO in S11), or when it has been judged that the retail store HDD 6 is not connected to the navigation apparatus 5 (NO in S12), the map data total update processing program is ended without starting the total update on the map data.

In S13, the CPU 51 performs a total update process on the navigation map data 39 stored in the navigation HDD 32. More specifically, the CPU 51 obtains the total update data 18 by reading from the retail store HDD 6 being connected and collectively updates the total area of the navigation map data 39 to a version of map data that corresponds to the total update data (more specifically, the newest version for each area at a point in time when the total update data is created), by using the obtained total update data 18. In this situation, the total update data 18 contains version information used for identifying the version of the total update data 18. The process in S13 corresponds to the process performed by the total update information obtaining means and the total updating means.

After that, in S14, the CPU 51 compares the version of the total update data used in the total update process with each of the versions of the pieces of difference update data 17 that have already been updated and stored in the navigation HDD 32 in S5.

Figure 9:
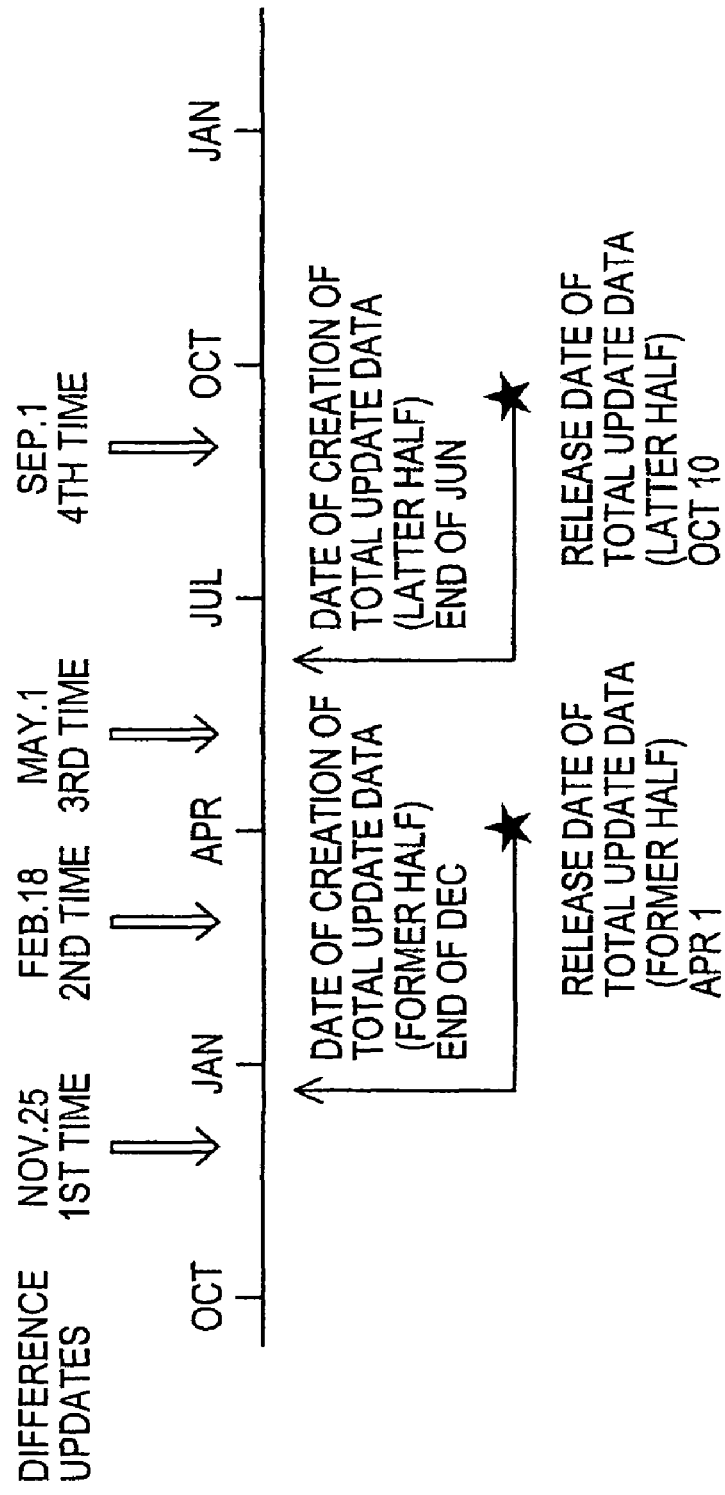
FIG. 9 is a drawing that shows an example of a schedule for performing total updates and difference updates

In this situation, for the total update data used for collectively performing an update on the nationwide map data, there is a big difference between the time at which the data is created and the time at which the data is released for sale. Thus, depending on when the total update is performed (S13), there is a possibility that the map data of a specific area may be changed back to an old version of map data that was in use before the difference update process was performed in S4. For example, in a case where the map distribution center 2 creates and sells the total update data according to the schedule shown in FIG. 9, if a user performs a total update on the map data at the retail store 3 at the end of September, the map data owned by the user is updated to the map data that was created at the end of December, which is nine months before the total update is performed. As shown in FIG. 9, assuming that four difference updates have been performed based on difference update data on November 25th, February 18th, May 1st, and September 1st, the total update data that was created at the end of December is in correspondence with the difference update performed on November 25th, but is not in correspondence with the other difference updates. Thus, for the areas that are the targets of the three difference updates performed on February 18th, May 1st, and September 1st, the map data is changed back to an old version of map data.

The problem described above will be explained more in detail, with reference to FIG. 8. FIG. 8 presents exemplary schematic charts that show, for each of the areas, versions of the navigation map data 39 before the total update is performed and the versions of navigation map data 39 after the total update is performed.

As shown in FIG. 8, before the total update is performed, difference updates have been performed on the navigation map data 39 so that the map data for the area A is version 1, for the area B is version 2, for the area C is version 3, for the area D is version 2, for the area E is version 3, and for the area F is version 2. However, assuming that difference updates are performed on the area C and the area E after the total update data is created, and the total update data is in correspondence with only up to version 2. In this case, the versions of the map data for the area C and the area E will be changed back to version 2 when the total update is performed. As a result, the map data for the area C and the area E needs to be updated again, by using the difference update data 17.

In this situation, the map updating system 1 is configured, as explained above, so that after the navigation apparatus 5 performs the difference update on the navigation map data 39, the difference update data 17 used in the difference update is stored for one year at the maximum since the date of creation (S4 to S7). The storing period is arranged to be one year at the maximum because the period of time between when a version of total update data 18 is created at the map distribution center 2 and when a following version of the total update data 18 is put up for sale is shorter than one year at the maximum. In other words, the contents of the updates in the difference update data 17 for which one year has elapsed since the date of creation are already reflected in the contents of the updates in the total update data 18 that is currently for sale.

In S15, based on the result of the comparison between the total update data and the difference update data 17 in S14, the CPU 51 judges whether or not the navigation HDD 32 stores therein any piece of difference update data 17 of which the version is newer than that of the total update data 18. The process in S15 corresponds to the process performed by the comparing means.

As a result, when it has been judged that the navigation HDD 32 stores therein a piece of difference update data 17 of which the version is newer than that of the total update data 18 (YES in S15), such a piece of the difference update data 17 is extracted from the navigation HDD 32 (S16). Subsequently, a difference update process is performed on the navigation map data 39 by using the extracted piece of difference update data 17 (S17). After that, in S18, the CPU 11 deletes the pieces of difference update data 17 that have been stored up to that point in time in S17 from the navigation HDD 32. The process in S16 corresponds to the process performed by the information extracting means, whereas the process in S17 corresponds to the process performed by the re-updating means. The process at S18 corresponds to the process performed by the information deleting means.

On the other hand, when it has been judged that the navigation HDD 32 stores therein no such piece of difference update data 17 of which the version is newer than that of the total update data 18 (NO in S15), there is no need to perform a difference update. Thus, the map data total update processing program is ended.

As explained in detail above, in the map updating system 1, when the navigation apparatus 5 performs the difference update (S4) on the navigation map data 39 based on the difference update data 17 distributed from the map distribution center 2, the difference update data 17 used in the difference update is stored into the navigation HDD 32 (S5). When the navigation apparatus 5 performs a total update on the navigation map data 39 thereafter, a difference update is performed again (S17) by using such a piece of difference update data stored in the navigation HDD 32 of which the version is newer than that of the total update data. Thus, even in a case where it is necessary to perform an update again with difference update data when the total update has been performed on the navigation map data 39, it is possible to update the map data to optimal map data without having to obtain the difference update data from the map distribution center 2 again. Consequently, it is possible to shorten the time period for performing the update and to reduce the processing load.

Also, after the update is performed, the pieces of difference update data 17 that have been stored up to that point in time are deleted from the navigation HDD 32 (S18). Thus, by deleting the pieces of the difference update data 17 whenever they have become unnecessary, it is possible to make sure that the navigation HDD 32 has sufficient storage area. As a result, it is possible to improve the processing speed related to searching for and extracting the difference update data 17.

Further, it is judged whether or not one year has elapsed since the dates of creation on which the pieces of difference update data were created respectively (S6). Any of the pieces of difference update data 17 for which it has been judged that one year has elapsed is deleted from the navigation HDD 32 (S7). Thus, by deleting the old pieces of difference update data 17 of which the update contents have been reflected in the total update data 18, it is possible to make sure that the navigation HDD 32 has sufficient storage area. Consequently, it is possible to improve the processing speed related to searching for and extracting the difference update data.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

For example, in order to perform a total update on the navigation map data 39 stored in the navigation apparatus 5, the total update is performed after the retail store HDD 6 is removed from the retail store PC 20 and connected to the navigation apparatus 5. However, it is acceptable to have an arrangement in which the total update is performed on the navigation map data 39 after the navigation HDD 32 is removed from the navigation apparatus 5 and connected to the retail store PC 20. In this case, control is exercised so that the processes in S11 through S18 are performed on the retail store PC 20.

Also, when one year has elapsed since the date on which a piece of difference update data 17 was created or since the date on which the navigation apparatus 5 obtained the piece of difference update data 17, the piece of difference update data 17 is deleted from the navigation HDD 32. However, it is possible to change, as necessary, the predetermined period of time before the deletion, according to the schedules of the creation and the sale of the total update data used by the map distribution center 2. For example, in a case where the period of time between when a version of total update data 18 is created at the map distribution center 2 and when a following version of the total update data 18 is put up for sale is shorter than two years at the maximum, it is preferable to have an arrangement in which when two years have elapsed since the date on which a piece of difference update data 17 was created or since the date on which the navigation apparatus 5 obtained the piece of difference update data 17, the piece of difference update data 17 is deleted from the navigation HDD 32.

In the description above, the example in which the map data stored in the navigation apparatus 5 is updated is explained. However, it is possible to apply the present invention to updates of map data stored in any other apparatus besides the apparatus navigation apparatus 5, as long as the apparatus stores therein some map data.

The invention claimed is:

1. A map updating system comprising:
    a memory configured to store map information, including one or more pieces of difference update information;
    a controller configured to:
        obtain the one or more pieces of difference update information, each piece of the difference update information being configured to update only a specific area of the map information stored in the memory;
        perform a difference update on the map information based on the one or more pieces of difference update information;
        record to the memory the difference update information that were used in the difference update;
        obtain total update information, the total update information being configured to update a total area of the map information stored in the memory;
        perform a total update on the map information based on the total update information;
        compare, after the total update, a version of the total update information used in the total update with each of versions of the one or more pieces of difference update information that were recorded to the memory before the total update;
        extract, from the memory, any of the one or more pieces of difference update information of which the version is judged to be newer than the version of the total update information;
        update the map information on which the total update has been performed based on the any of the difference update information; and
        delete the one or more pieces of difference update information including the any of the difference update information from the memory after the map information is updated.

2. The map updating system according to claim 1, wherein the memory stores a time of creation at which each of the one or more pieces of difference update information was created or a time of obtainment at which each of the one or more pieces of difference update information was obtained;
    the controller being further configured to:
        judge whether or not a predetermined period of time has elapsed since the time of creation or the time of obtainment; and
        delete, from the memory, any of the one or more pieces of difference update information for which the predetermined period of time has elapsed.

3. The map updating system of claim 1, wherein the memory is at least one of a hard disk drive, a flexible disk, a memory card, a magnetic tape, a magnetic drum, an optical disk, an MO, an IC card.

4. The map updating system of claim 2, wherein the predetermined period of time is based according to a schedule of creation of the total update information.

5. The map updating system of claim 2, wherein the predetermined period of time is one year.

6. A map updating method comprising:
    obtaining one or more pieces of difference update information, each piece of the difference update information being configured to update only a specific area of map information stored in a memory;
    performing a difference update on the map information based on the one or more pieces of difference update information;
    recording to the memory the difference update information that were used in the difference update;
    obtaining total update information, the total update information being configured to update a total area of the map information stored in the memory;
    performing a total update on the map information based on the total update information;
    storing the one or more pieces of difference update information in the memory;
    comparing, after the total update, a version of the total update information used in the total update with each of versions of the one or more pieces of difference update information that were recorded to the memory before the total update;

extracting any of the one or more pieces of difference update information of which the version is judged to be newer than the version of the total update information;

updating the map information on which the total update has been performed based on the any of the difference update information; and deleting the one or more pieces of difference update information including the any of the difference update information extracted by the information extracting step from the memory after the map information is updated.

7. The map updating method according to claim 6, wherein the memory stores a time of creation at which each of the one or more pieces of difference update information was created or a time of obtainment at which each of the one or more pieces of difference update information was obtained.

8. The map updating method according to claim 7, further comprising:

judging whether or not a predetermined period of time has elapsed since the time of creation or the time of obtainment; and delete, from the memory, any of the one or more pieces of difference update information for which the predetermined period of time has elapsed.

9. The map updating method of claim 8, wherein the predetermined period of time is based according to a schedule of creation of the total update information.

10. The map updating method of claim 8, wherein the predetermined period of time is one year.

11. A computer-executable program embodied on a non-volatile computer-readable medium executable by a computer to perform a map updating process, the computer-executable program comprising:

instructions for obtaining one or more pieces of difference update information, each piece of the difference update information being configured to update only a specific area of map information stored in a map information storage medium;

instructions for performing a difference update of the map information based on the one or more pieces of difference update information;

instructions to record to the memory the difference update information that were used in the difference update;

instructions for obtaining total update information, the total update information being configured to update a total area of the map information stored in the map information storage medium;

instructions for performing a total update on the map information based on the total update information;

instructions for storing the one or more pieces of difference update information in the memory;

instructions for comparing, after the total update, a version of the total update information used in the total update with each of versions of the one or more pieces of difference update information that were recorded to the memory before the total update;

instructions for extracting any of the one or more pieces of difference update information of which the version is judged to be newer than the version of the total update information;

instructions for updating the map information on which the total update has been performed based on the any of the difference update information; and instructions for deleting the one or more pieces of difference update information including the any of the difference update information extracted from the memory after the map information is updated.

12. The computer-executable program embodied on a computer-readable medium executable by a computer to perform a map updating process of claim 11, wherein the memory stores a time of creation at which each of the one or more pieces of difference update information was created or a time of obtainment at which each of the one or more pieces of difference update information was obtained.

13. The computer-executable program embodied on a computer-readable medium executable by a computer to perform a map updating process of claim 12, the computer-executable program further comprising:

instructions for judging whether or not a predetermined period of time has elapsed since the time of creation or the time of obtainment; and instructions for deleting, from the memory, any of the one or more pieces of difference update information for which the predetermined period of time has elapsed.

14. The computer-executable program embodied on a computer-readable medium executable by a computer to perform a map updating process of claim 13, wherein the predetermined period of time is based according to a schedule of creation of the total update information.

15. The computer-executable program embodied on a computer-readable medium executable by a computer to perform a map updating process of claim 13, wherein the predetermined period of time is one year.

* * * * *